United States Patent [19]

Lyons

[11] Patent Number: 4,821,397

[45] Date of Patent: Apr. 18, 1989

[54] METHOD FOR WET REMOVAL OF ASBESTOS INSULATION

[76] Inventor: William G. Lyons, Riverview Rd., Rexford, N.Y. 12148

[21] Appl. No.: 70,251

[22] Filed: Jul. 6, 1987

[51] Int. Cl.[4] .............................................. B23P 19/02

[52] U.S. Cl. .................................. 29/426.4; 134/25.1; 134/26; 134/42; 15/227; 98/115.1; 312/1

[58] Field of Search .................. 134/21, 6, 10, 21, 42, 134/26, 25.1, 25.4; 15/227; 98/115 LH, 115 R, 115 SB; 29/426.4; 128 R/1 R; 205/26; 312/1; 138/97

[56] References Cited

U.S. PATENT DOCUMENTS 4,626,291 12/1986 Natale .................................. 134/21

4,699,666 10/1987 Tidquist et al. ........................ 134/42

*Primary Examiner*—H. M. S. Sneed

*Assistant Examiner*—Sharon T. Cohen

*Attorney, Agent, or Firm*—Jerome J. Norris

[57] ABSTRACT

Method for complete wet removal of asbestos from pipes comprising placing a trough with semi-circular recesses in insertable end walls around a pipe, sealing spaces between recesses and pipe after securing trough to pipe, pouring solution into trough to immerse pipe and soften asbestos, removing solution, cleaning off asbestos with tool, and wiping pipe with a soaked cloth.

6 Claims, 2 Drawing Sheets

METHOD FOR WET REMOVAL OF ASBESTOS INSULATION

FIELD OF THE INVENTION

The invention relates to a method of using troughs for wet removal of asbestos insulation or other hazardous materials from pipes, joints and valves of various shapes, that are disposed horizontally, vertically or otherwise.

BACKGROUND OF THE INVENTION

Asbestos has been used for pipe covering insulation, and this specific insulation has been applied to pipes in the forms of preformed fibrous asbestos wrapping, asbestos fiber felt, insulated cement, corrugated paper and in mixtures of magnesia with asbestos. The applied asbestos insulating material is generally covered with a protective jacket made of cloth, paper or cement. In some instances, the asbestos insulation is covered with tape or millboard.

However, asbestos has been found to be harmful to human beings and its fields of application are either being eliminated or increasingly restricted. The reason is that asbestos adheres in the lungs upon inhalation and spreads to other parts of the body, and becomes, among other things, a known carcinogen. In view of these known risks of asbestos as a health hazard, public officials have required the removal of asbestos insulation materials that have been applied in: the construction field; heating insulation; partition walls; fire retarding materials in floor structures, etc.

During the removal of asbestos the area of removal is generally sealed off and the asbestos is sucked into containers from which the dust like asbestos particles are removed and packed into plastic bags. The bags are then taken to garbage stations where they are stored or buried in land fills. However during these handling operations there is a risk that the asbestos will escape from the bags, either when the asbestos is being filled into the bags or during transport if a bag is damaged.

In the case where large amounts of asbestos are transported to garbage stations, water is poured over the asbestos to prevent dust formation.

Because of the risks posed by dust, sealing off or containment of the work area from which asbestos is to be removed is essential, and such containment requires construction of barriers with plastic sheets joined with folded seams and sealing tape at the seams and boundaries. Moreover, air locks and worker decontamination facilities equipped with showers must be employed when a negative air pressure system is used in concert with the sealing off or containment method and abatement or removal activities are generally carried out during vacations or at times when few people are in the premises in order to reduce risks.

In these circumstances, it is well known that the cost of containment can often times exceed the cost of the actual abatement. Further yet, in these containment procedures for asbestos abatement or removal, the worker is still required to enter the containment area in order to remove the asbestos.

In the area of containment, it is also known that, during removal of asbestos insulation coverings from pipes and valves, the operation is attendant with risks because of the tendency for remnants or small asbestos fibers to remain intact around the pipes and valves, and become airborne, either during removal or at a later point in time after the removal operation is finished.

The invention relates to a complete wet method of removing and recovering harmful insulating materials which are detrimental to the environment, in a manner such that the materials are not dissipated into the surroundings to pollute the environment and harm human beings. One of the materials falling into this harmful category is asbestos.

It is an object of the present invention to provide a method for complete wet removal of asbestos insulation and other hazardous materials from structures of pipes, joints and valves without the need to provide an elaborate containment area having construction barriers with plastic sheets joined with folded seams, and sealing tape at the seams.

It is a further object of the invention to provide a method utilizing trough means for complete wet removal of asbestos insulation and other hazardous material from structures of pipes, joints and valves without the need to provide air locks and worker decontamination facilities with showers in association with a containment area.

A yet further object of the invention is to provide a method utilizing trough means for complete wet removal of asbestos insulation and other hazardous materials from structures of pipes, joints and valves, without the need for establishing negative air pressure systems to insure against escape of harmful fiber particles into the environment.

These and other objects of the invention will become more apparent from the disclosure and detailed descriptions of the method hereafter set forth.

SUMMARY OF THE INVENTION

In accordance with the present invention, a method of utilizing trough means with provisions for maintaining asbestos insulated pipes and joints immersed in an aqueous solution are provided, in order to facilitate complete wet removal of the aqueous solution saturated asbestos fibers, without the risks of asbestos fibers escaping into the environment to occasion harm.

Toward these ends, and in the case of a horizontally disposed asbestos insulated pipe, there is provided a rectangular trough with semi-circular recesses in insertable upper and lower end walls and opposing port hole slots in a part of the upper trough walls, and through which support bars secure the trough around the pipe. These semi-circular recesses saddle the pipe when joined to create a damming effect. The trough is positioned to place the asbestos covered pipe into semi-circular recesses in the insertable trough end walls; thereafter, support bars are pushed through the opposing port hole slots in order to hold the trough in place around the insulated pipe. Sealing means are then employed to provide removable neoprene or rubber seals between the outer diameter of the insulated pipe and the spaces between the semi-circular saddles as well as any spaces between the upper end wall and the lower end wall. In order to avoid the need to effect seals between the port slots and the support bars, the part of the support bars which rests on the pipes may be stepped invertedly with a riser in order to prevent the level of added water from rising to the lowest part of the port-hole-slot-support-bar juncture. Alternatively, the support bars can have a semi-circular arc riser to prevent the water from rising to the bottom of the port opening.

After the asbestos covered pipe has been completely soaked from complete immersion in an aqueous solution for a period of from about fifteen minutes to about one hour, the solution may be removed through a trough drain and filtered for re-use, or in the alternative, the trough containing the solution may be removed.

The aqueous solution saturated asbestos material is removed with a plastic or metal tool, such as a chisel or spatula, and placed into a plastic bag for disposal in a licensed land fill or other sanctioned areas. The uncovered pipe is then thoroughly wiped with a cloth containing water or oil, and the wet cloth may be discarded into the plastic bag for disposal along with the asbestos. It has been found that the complete wet removal process of the invention only requires about one-tenth of the time ordinarily needed to remove asbestos through containment methods using negative air means.

In the case of a vertically disposed asbestos covered pipe, two mating halves of semi-cylindrical troughs with semi-circular recesses in insertable semi-circular end walls are placed around a pipe and flanges of these troughs abutt diametrally when the trough is in place around the pipe. The space between the pipe and the semicircular recess walls at the lower part of the entroughed pipe may be removably sealed by a neoprene or rubber gasket or by a rubbery washer placed around the pipe area immediately adjoining the interior end walls of the semi-circular recesses of the trough. Clamping means are placed about the joined trough to secure them firmly in place around the pipe before the aqueous solution is poured in from the top to completely immerse the asbestos areas of the vertical pipe to be soaked. Pretensioned foam rubber strips may be affixed to interior parts of the trough in order to assist in securing the troughs around the structure immediately prior to placing the troughs in matching or mating relationship around the pipe. After soaking, the water may be removed through a trough drain in the lower part of one of the semi-cylindrical troughs and filtered for re-use, if desired.

DETAILED DESCRIPTION OF THE INVENTION

Figure 1:
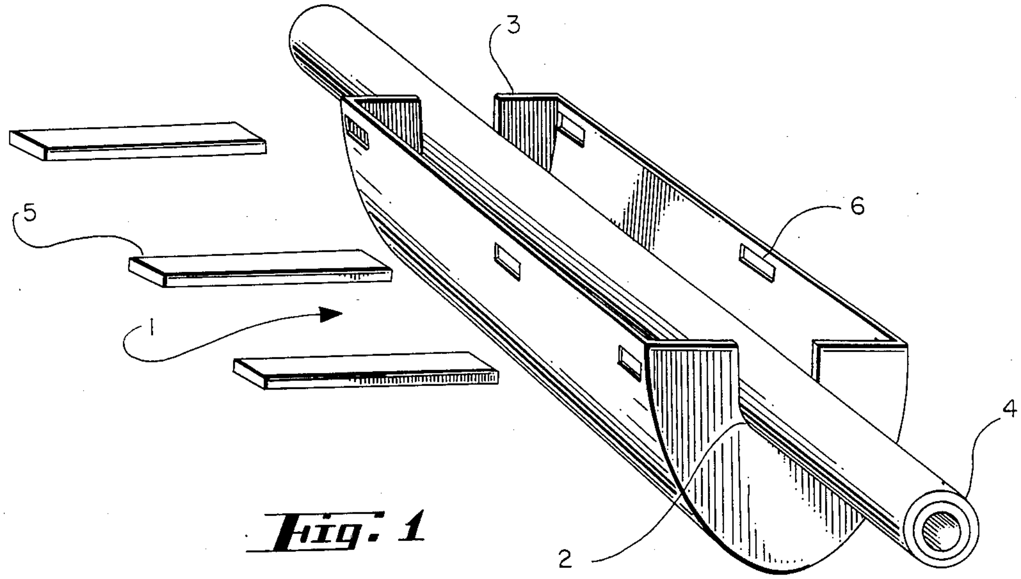
FIG. 1 is an exploded view in perspective showing a horizontally entroughed asbestos covered pipe before support bars are inserted to secure it in place around the pipe.
Figure 2:
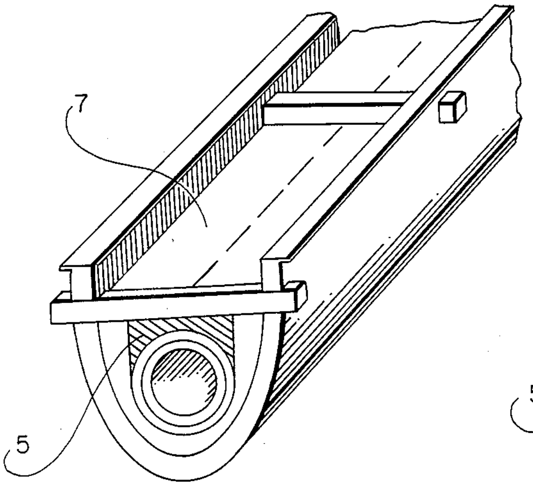
FIG. 2 is a view in perspective showing a horizontally entroughed asbestos covered pipe with support bars in place, and water surrounding said pipe.

With reference to the drawings, FIG. 1 depicts a semi-cylindrical trough 1 with semi-circular recesses 2, in upper and lower end walls 3*a* and 3*b*, positioned around a portion of asbestos covered pipe 4. Grooves are cut near the ends of the bottom and side walls of the trough to allow the upper and lower end walls with semi-circular recesses to fit in saddle relationship over the covered pipe, when the tongued edges of said upper and lower end walls are slid into said grooves. Support bars 5 with a semi-circular or inverted stepped riser, are placed through port hole slots or openings 6 in the upper wall part of the trough in resting position on the asbestos covered pipe, as shown in FIG. 2, prior to sealing.

In order to ensure retention of enough aqueous solution or water in the trough to completely immerse and soak the asbestos covered pipe for saturation and loosening of asbestos, removable seals or gaskets are placed between the outer diameter of the asbestos covered pipe and the spaces between the semi-circular recesses saddling the pipe in the end walls. A suitable seal may be effected in several ways. For example, Neoprene® gasket putty may be placed in the spaces between said pipe and said saddling recesses. If need be, sealing can also be effected between any spaces between the port hole openings in the trough and the support bar juncture. Also, if necessary groove 5*a* can be placed in the top or bottom near the end of the support bars to effect a firm hold between said slots and the walls of the trough.

A removable seal may also be effected by encircling a deformable and openable pretensioned water proof foamed rubber material around said pipe in order to close off any spaces between said pipe and said saddling recesses.

An openable plastic or rubber washer can also be placed around the asbestos covered pipe in order to provide a removable seal, immediately prior to pouring an aqueous solution into the trough to completely immerse said covered pipe in water 7.

To avoid any need to effect a seal between the port hole slots and the support bars, the lower portion of the support bars which rests on the upper part of the asbestos covered pipe may be provided with either a horizontal inverted step or riser or an inverted loop or semi-circular riser in order to prevent the level of added water from rising as high as the lower part of the port hole openings.

Figure 3:
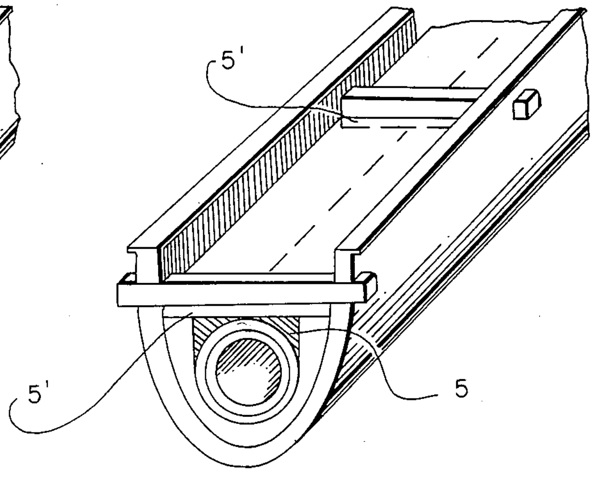
FIG. 3 is a view in perspective as in FIG. 2 but showing inverted stepped support bars.

FIG. 3 shows a horizontally entroughed asbestos covered pipe with inverted stepped support bars 5' in place, and water completely immersing said pipe, but with the highest level of water below the lowest part of the port hole openings.

After water is added in sufficient amount to completely immerse the asbestos covered pipe, soaking is allowed for a period ranging from about fifteen minutes to about one hour. The time of soaking which is needed to completely saturate, soften and loosen the asbestos will depend upon the thickness of the asbestos coating. In general, thicker coatings will require longer soaking times. It has been found that adding small amounts of emulsifiers such is Serpiflex® increases the water penetration rate and reduces the soaking time needed to soften the asbestos to a point where it can be mechanically removed without risks of friable particles or fibers escaping into the air.

While rectangular troughs with semi-circular recesses in the insertable end walls are easily adaptable for effecting soaking on straight horizontally or vertically disposed asbestos covered pipes, it is to be understood that rectangular shaped troughs with semi-circular recesses are preferred to accomodate horizontally and vertically disposed asbestos covered pipes and joints which are not straight.

Figure 5:
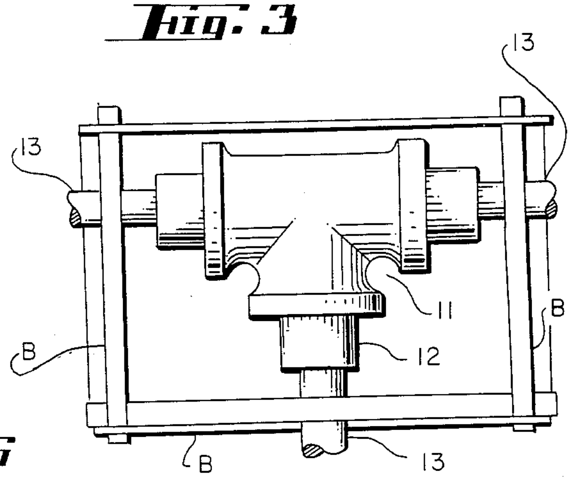
FIG. 5 is a top view in perspective showing rectangular shaped trough means for a horizontally disposed "tee" pipe connection with "branch" and "run".

An example of such an asbestos covered pipe is shown in FIG. 5 with "tee" 11, "run" 12, and "branch" 13. In this pipe and joint configuration, the trough requires a total of six semi-circular recesses in three end walls having upper and lower parts which fit around the "tee" joint segment for asbestos removal.

After soaking for a sufficient period to completely wet, saturate and soften the asbestos, the water may be removed by either removing the trough or draining off the water through a drain cock situated at the bottom of the trough.

Figure 4:
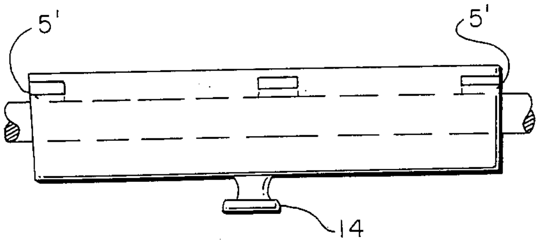
FIG. 4 is a side view in perspective showing a drain cock for removal of water from a horizontally disposed trough in accordance with the invention.

FIG. 4 depicts a drain cock 14 which is integral to the bottom of a rectangular shaped trough. However, the drain cock can be made integral to the base portion area of any geometrically shaped trough that is used within the context of the invention for purposes of removing the water prior to filtering (not shown) and re-using it.

It has been found that the soaked and softened asbestos is most easily removed if a longitudinal or horizontal slit is made in the loosened asbestos covering with a knife before removing the asbestos with a plastic tool, such as a chisel or spatula. Also, if the asbestos covering has been painted over after the insulation is laid, the horizontal slitting prior to removal facilitates more rapid removal of the asbestos insulation covering. Further, if tin or some other metal gauge bands have been placed around the asbestos insulation covering, it will be necessary to cut the bands prior to slitting and removing the softened asbestos covering. After the covering has been substantially completely removed with a plastic spatula, the structure may be wiped with either a wet cloth or an oil soaked rag to ensure that any remnants of friable asbestos particles which may have remained intact on the pipe are removed. This latter step would prevent escapement to the environment of any remaining friable asbestos particles.

When compared to the containment, sealing off, negative air combination method of asbestos abatement, the method using the troughs in the present invention enables the abatement process to proceed more simply and more economically, and at rates up to as much as about one-tenth of the time required by the combination method.

FIG. 5 is a top view in perspective showing a rectangular shaped trough accomodating a horizontally disposed asbestos covered pipe which is not straight. "Tee" part 11 and "branch" part 12 are positioned within the trough and "runs" 13 are in resting positions in the semi-circular recesses of the trough end walls. Bars B, support the weight of the trough on the "runs".

Figure 6:
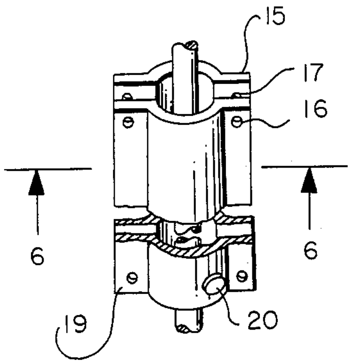
FIG. 6 is a side view in perspective showing mating halves of semi-cylindrical troughs joined diametrally at their flanges in place around a vertically disposed pipe.

When the trough is flanged, as in FIG. 6, two mating halves of semi-cylindrical troughs may be diametrally joined at the flanges around a vertically disposed asbestos covered pipe, where flanges 15 sandwich rubber or plastic gaskets 17 therebetween, and wherein bolts can be used in holes to hold the flanges together. Optionally, the flanges may be held together without bolting by the use of any suitable clamping means (not shown).

The means used to maintain the two halves of semi-cylindrical troughs in contact with the vertically disposed asbestos covered pipe are pretensioned water permeable foamed rubber strips 18, which can be affixed by gluing or any other suitable means in the interior of each semi-cylindrical trough. Clamps (not shown) placed over the rubber strips exterior to the troughs can used to hold the troughs in place.

Figure 6A:
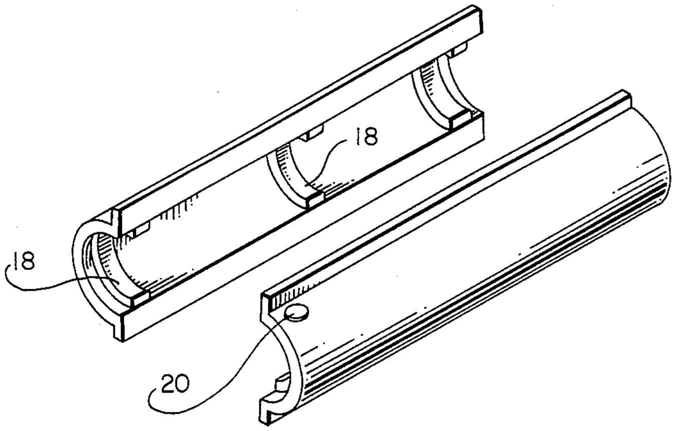
FIG. 6A shows two semi-cylindrical troughs without the asbestos pipe.

In order to ensure that the weight of water in the column around the vertically disposed pipe is held fast, grooves 19 are cut in the interior of the semi-cylindrical troughs near the end in order to allow tongued semi-circular shaped end walls 21 of FIG. 6A having semi-circular recesses to be fitted therein, and in saddling relationship around the covered pipe. Further, a Neoprene® gasket putty or an openable plastic or rubber washer can be used in any spaces between the pipe and semi-circular recesses or between the joined edges of the semi-circular shaped end walls to effect a seal of sufficient strength to hold the weight of water in the column free from leakage or seeping.

After water is poured into the unsealed top portion of the vertically entroughed pipe and allowed to remain for a sufficient period to soften the asbestos insulation covering, the water is drained off through a drain cock 20 which forms an integral part with a lower portion of a semi-cylindrical wall of the trough, and the asbestos insulation is cleaned-off in the same manner described in connection with the horizontally disposed pipe.

Figure 7:
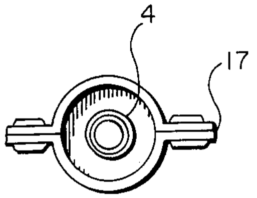
FIG. 7 is a view taken along line 6—6 of FIG. 6.

FIG. 7 is a view taken along line 6—6 of FIG. 6, showing asbestos covered pipe 4.

Figure 8:
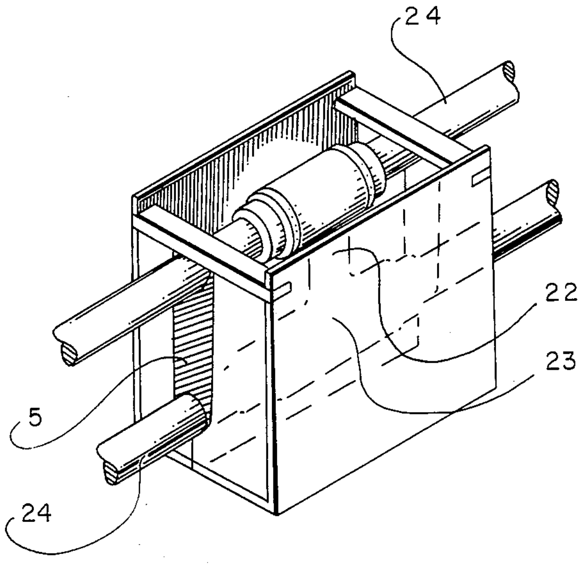
FIG. 8 is a view in perspective showing mating halves of rectangular troughs with flanges in place around a vertically disposed pipe having "tee" joints and a "branch".

FIG. 8 is a view in perspective showing a rectangular shaped trough with flanges in place around a vertically disposed non-straight pipe having a "tee joint" 22, a "branch" 23, and a "runs" 24. The end wall 25 is composed of upper and lower walls whose tongued edges are first slid into grooves in the trough walls. The middle or intermediate wall, which is also composed of flexible plastic is then bent into the grooves between the upper and lower walls before the solution is added for soaking.

The advance made to the art of asbestos abatement or removal using the soaking troughs of the present invention enables asbestos removal contractors to simply and economically remove or clean asbestos away from single or branched pipes, whether horizontally or vertically disposed, in a fraction of the time normally required when using other methods for removal. Moreover, the semi-circular recesses in the trough end walls can be made to accomodate any size of covered pipe.

While the invention has been described in detailed specifics for purposes of illustration only, it is to be understood that many changes can be made in the methods of removal or abatement using the trough soaking devices of the invention without departing from the invention scope, which is defined in the appended claims.

What is claimed is:

1. A method for complete wet removal of asbestos insulation covering and like hazardous materials from a structure of a pipe, joint or valve, comprising:

(a) positioning a length of trough around an asbestos covered structure by placing support bars through openings in upper wall portions of said trough to hold said trough in place around said structure;

(b) securing side walls of said trough to said structure;

(c) placing upper and lower end walls having semi-circular recesses in saddling relationship around said structure and into grooves in the side walls of said trough;

(d) sealing any spaces between said recesses and said covered structure;

(e) pouring water into said trough through the top until said structure is completely immersed in water;

(f) allowing the water to remain until said insulated covering is completely wetted and softened;

(g) removing water from around said structure through a drain cock in said trough;

(h) slitting a softened length of covering with a cutting tool and substantially removing said softened covering from said structure; and (i) wiping the uncovered structure with a cloth saturated with an aqueous solution or oil to insure that no friable remnants of asbestos or like hazardous materials are left intact on said structure.

2. The method of claim 1, wherein said trough is semi-cylindrical in shape and said means to secure said trough on said structure comprises opposing port hole openings in upper side wall portions of said trough and support bars placed through said openings in resting positions on said structure.

3. The method of claim 2, wherein said support bars are provided with inverted step portions.

4. The method of claim 1 wherein said trough is rectangular in shape and said means to secure said trough on said structure comprises port hole openings in upper side wall portions of said trough and support bars placed through said slots in resting positions on said structure.

5. The method of claim 4, wherein said support bars ar provided with inverted step portions.

6. The method of claim 1, wherein an emulsifier is included in said water.

* * * * *